2,996,467
ASPHALT-OIL-RUBBER COMPOSITION
Harold M. Hawley, Frederick E. Arthur, and Garald F. Allen, Midland, Mich., assignors to Dow Chemical Company, Midland, Mich., a corporation of Delaware
No Drawing. Filed Mar. 4, 1957, Ser. No. 643,885
1 Claim. (Cl. 260—28.5)

This invention relates to asphalt modified by the addition of a rubber-petroleum oil plasticizer and to methods for the production of such asphalt.

Asphalts are characterized by a three-part temperature scale—a brittle range, a plastic range and a fluid range. For most uses, the plastic range is the useful one and it is desirable that this range be as wide as possible. This range may be defined as extending from the brittle point to the softening point. Thus, it is desirable that an asphalt have a low brittle point and a high softening point.

Methods are known for lowering the brittle point of asphalt, as for example, by the incorporation of various oils or plasticizers. Unfortunately, however, these methods also lower the softening points. Likewise, methods are known for raising the softening point, the most commonly used one being that of blowing, i.e., blowing air through the liquid asphalt at a high temperature. Unfortunately, these methods also raise the brittle point. In short, methods are available for shifting the plastic range up or down the temperature scale but they have little or no effectiveness in expanding the plastic range.

Accordingly, it is an object of this invention to provide modified asphalts having useful plastic properties over a wide temperature range. Another object is to provide asphalts having improved adhesive and cohesive properties. A further object is to provide processes for making the improved asphalts.

According to the invention, the above objects are achieved by incorporating into certain asphalts a modifier comprising a petroleum oil and a synthetic rubber of the butadiene-styrene type as hereinafter described. In the compositions described and claimed herein all parts are by weight, exclusive of the water content, if any.

The amount of the modifier used may be varied widely, being generally in the range of about 2 to 20 percent of the final modified asphalt, and preferably in the range 5 to 10 percent. Less than 2 percent produces only minor improvement in the properties of the product while more than 20 percent unnecessarily increases the cost of the product.

The ratio of butadiene to styrene in the rubber component of the modifier should be at least 60:40, and preferably at least 75:25. Ratios as high as 90:10 are satisfactory, particularly when low brittle point and high adhesive power are especially desired in the product. While the rubber may be in any physical form, such as crumb, milled sheet, molded slab, etc., the preferred form is a latex, especially a high-solids latex. This particular form is easy to blend with the oil; also the emulsified modifier thus obtained is easy to disperse in the asphalt. In order for the modifier to be a free-flowing fluid emulsion, the rubber emulsion used should be such that the oil-rubber modifier contains at least about 10 percent of water.

The oil component of the modifier should be a petroleum oil of viscosity about 50 to 800 Saybolt Universal seconds at 100° F. If the modifier is to be incorporated into the asphalt by the preferred method of stirring it into the hot, liquefied asphalt, a further limitation on the oil component is that it should have a flash point of at least about 400° F., and preferably 500° or more.

The ratio of oil to rubber in the modifier is subject to considerable variation, depending primarily on the type of asphalt in which the modifier is to be used and the particular properties desired in the final product. In general, high-oil modifiers yield asphalts of low softening point but also low ductility and increased tendency to stain and bleed. On the other hand, high-rubber modifiers yield asphalts of high softening point, high ductility and lower tendency to bleed and stain but having the disadvantage of high viscosity when melted, thus making them difficult to work. Moreover, the rubber adds greatly to the cost of the final product. As a compromise between these opposing factors, we generally prefer an oil-rubber ratio of about 1:1 to 5:1, though other ratios may be used for special purposes.

While almost any asphalt can be improved by the addition of our modifier, we prefer to use blown, particularly catalytically blown, petroleum asphalt, since this particular type shows the greatest improvement from use of the modifier and is most useful for many purposes. A particularly valuable modified asphalt, useful as a combination adhesive-moisture barrier in laminations of paper, fabric and the like, is obtained by adding our modifier to a catalytically blown petroleum asphalt of softening point about 160 to 250° F., preferably about 200° F. The preparation of such a product is illustrated by the following example.

FORMULA

|  | Parts |
|---|---|
| Oil | 4.5 |
| Rubber latex | [1] 2.0 |
| Asphalt | 93.5 |

[1] Including water.

MATERIALS

The oil used was a petroleum distillate of viscosity, 150–200 S.U.S at 100° F. and flash point, 500° F.

The rubber latex contained 65 percent solids, the solids being a copolymer of 84 percent butadiene and 16 percent styrene. It is of the type sold by Copolymer Corporation as GRS 2102.

A catalytically blown petroleum asphalt made by Lion Oil Company and having the properties shown in the table below was used.

PROCEDURE

The modifier was prepared by stirring the rubber latex into the oil at room temperature. A uniform, free-flowing emulsion was quickly and easily formed.

The asphalt was heated to about 375° F., at which temperature it was quite fluid and could readily be pumped, stirred, or otherwise agitated. While the asphalt was maintained in such molten condition, the modifier was slowly added to it, effective agitation being maintained so that the modifier was quickly and uniformly dispersed throughout the asphalt. Agitation was continued for one hour after all the modifier had been added, in order to insure complete uniformity of the product.

The improvement in important physical properties obtained by addition of the modifier is shown in the following table.

Table
PHYSICAL PROPERTIES OF ASPHALTS

|  | Original | Modified |
|---|---|---|
| Softening Point, ° F | 200 | 205 |
| Brittle Point, ° F | 14 | 0 |
| Plastic Range, ° F | 186 | 205 |
| Ductility, cm | 3 | 10 |
| Penetration, mm.: |  |  |
| 32° F | 40 | 40 |
| 77° F | 50 | 50 |
| 115° F | 85 | 70 |

The modified asphalt prepared as described above was used in the manufacture of multiwall paper bags, in which use it was found to be far superior to any other commercially available asphalt because of its greater adhesion and cohesion, lack of staining and bleeding at high temperatures, greater toughness and flexibility at low temperatures and resistance to delamination, especially at low temperatures.

The oil used in the preparation of the modifier of the invention readily swells the rubber component of the modifier. For this reason, if the oil is to be blended with the rubber in the form of latex and if the resultant modifier is to be stirred or otherwise mixed into the asphalt without necessity for milling, the modifier must be added to the molten asphalt immediately after it is prepared. Otherwise, the oil swells the rubber into a sticky, gelatinous mass that is difficult to handle and to disperse in the asphalt.

While we have described a batch process for preparing our modified asphalt, the process is readily adaptable to continuous operation. In a continuous process the oil and latex may be continuously metered into the inlet of a centrifugal pump or other mixing device. The blended modifier may then be continuously metered into a stream of hot asphalt and mixed therewith by passage through an agitator device such as a pump or one or a series of constricted orifices in the pipeline or conduit carrying the stream of modified aspalt. Such a continuous process has the obvious advantages of reducing the size of or eliminating the need for mixing and/or heating kettles and of minimizing the time lag between the preparation and use of the modifier.

The product of the above example is particularly useful in laminating, adhesive, sealing and waterproofing applications. By suitable variations in the modifier and asphalt used, improved asphalts useful in other applications may be obtained. Thus, paving asphalts are notably improved by addition of even minimal amounts of our modifiers; particularly in reduction of cracking due to low temperature brittleness and in improvement in the adhesion of the asphalt to the stone aggregate generally used.

While methods other than those illustrated above may be used to mix the modifier with the asphalt, other known methods are tedious, expensive and less effective. Thus, rubber and/or oil may be milled into asphalt or they may be dissolved in a common solvent and the solvent then removed. Still another method is to shred the rubber and then stir it, either alone or with oil, into the molten asphalt. None of these methods are satisfactory, however, from the standpoint of either cost or effectiveness. To obtain the maximum benefit from use of our oil-rubber modifier it is essential that the latter be fully and uniformly dispersed in and blended with the asphalt and we have found no other method which even approaches the effectiveness of that disclosed and claimed herein.

We claim:

A process for making modified asphalt comprising: (1) preparing a modifier, consisting essentially of an oil-rubber emulsion, by intimately mixing about 1 to 5 parts by weight of a petroleum oil of about 50 to 800 Saybolt Universal seconds viscosity at 100° F. and having a flash point of at least about 400° F. with one part of a butadiene-styrene rubber latex the solids of which contain about 60–80 percent by weight of butadiene to 20–40 percent of styrene, said latex containing sufficient water to make the water content of the thus formed modifier at least about 10 percent by weight and (2) adding, slowly and with effective agitation, said modifier to molten asphalt in such amount that the product contains about 2–20 percent by weight of the modifier.

References Cited in the file of this patent

UNITED STATES PATENTS

| | | |
|---|---|---|
| 2,431,386 | Fischer | Nov. 25, 1947 |
| 2,504,605 | Thomas | Apr. 18, 1950 |
| 2,546,659 | Sussenbach | Mar. 27, 1951 |
| 2,686,166 | Taylor | Aug. 10, 1954 |
| 2,700,655 | Endres et al. | Jan. 25, 1955 |
| 2,728,734 | Cubberley et al. | Dec. 27, 1955 |
| 2,809,179 | Endres et al. | Oct. 8, 1957 |

FOREIGN PATENTS

| | | |
|---|---|---|
| 660,141 | Great Britain | Oct. 31, 1951 |